(12) United States Patent
Chang

(10) Patent No.: US 7,533,216 B2
(45) Date of Patent: May 12, 2009

(54) DEVICE AND METHOD FOR SIMULATING A HARD DISK

(75) Inventor: An-Sheng Chang, Taipei Hsien (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 129 days.

(21) Appl. No.: 11/227,260

(22) Filed: Sep. 16, 2005

(65) Prior Publication Data

US 2007/0067558 A1    Mar. 22, 2007

(51) Int. Cl.
  *G06F 12/00* (2006.01)
(52) U.S. Cl. .......................... 711/112; 711/4; 711/100; 711/111; 711/113; 711/114; 711/153; 711/170; 711/173; 710/3; 710/4; 710/56; 710/305; 710/306; 710/310; 713/1; 713/2
(58) Field of Classification Search ......... 711/111–113, 711/4, 100, 153, 170, 173; 710/3–4, 305–306, 710/310, 56; 713/1–2
See application file for complete search history.

(56) References Cited

U.S. PATENT DOCUMENTS

| | | | | |
|---|---|---|---|---|
| 5,594,926 A | | 1/1997 | Chang et al. | |
| 5,793,714 A | * | 8/1998 | Inoue et al. | 369/30.34 |
| 7,032,105 B2 | * | 4/2006 | Lin | 713/1 |
| 7,136,951 B2 | * | 11/2006 | Deng et al. | 710/302 |
| 2002/0129204 A1 | * | 9/2002 | Leighnor et al. | 711/118 |
| 2004/0064606 A1 | * | 4/2004 | Kimura | 710/56 |
| 2004/0210716 A1 | * | 10/2004 | Chuang | 711/115 |

* cited by examiner

*Primary Examiner*—Tuan V Thai
*Assistant Examiner*—Zhuo H Li
(74) *Attorney, Agent, or Firm*—Rosenberg, Klein & Lee

(57) ABSTRACT

A device and a method for simulating a hard disk are disclosed. The device has a core logic chip, a main memory module and a setting module. The setting module is used to set the main memory module to have a memory access area and a hard disk access area. The core logic chip has a memory controller and a conversion interface controller for controlling data reading of the memory access area and the hard disk access area, respectively. When the core logic chip receives a read/write signal sent to the main memory module from a computer system, it determines whether this read/write signal is a memory read/write signal or a hard disk read/write signal. If the read/write signal is for memory, it is sent to the memory controller; if the read/write signal is for hard disk, it is sent to the conversion interface controller.

15 Claims, 3 Drawing Sheets

DEVICE AND METHOD FOR SIMULATING A HARD DISK

BACKGROUND OF THE INVENTION

1. Field of the Invention

The present invention relates to a device and method for simulating a hard disk and, more particularly, to a device and method using a memory to simulate a hard disk.

2. Description of Related Art

Along with continual popularity of computers, the functions of a computer have become more and more powerful, and there are more and more peripherals that support computers such as card readers, USB devices, 1394 devices, and so on. With the enhancement of software technology and availability of various kinds of software in the market, users are attracted to use computers more and more frequently. Computers have become indispensable tools in everyday life, and they usually store various data for user access.

However, it still takes a lot of time for a computer to search for data. A lot of data are stored on the hard disk of a computer. Due to the structure of a hard disk, much of the access time is wasted in the seek-time for moving the magnetic head and the rotation time of the spindle motor. These are the primary reasons that the data access speed for a hard disk is not comparable to that for memory. Therefore, when a computer accesses data in a hard disk, even though the central processor is fast, it still needs to wait for the data processing time of the hard disk.

In order to increase the speed of hard disk, U.S. Pat. No. 5,594,926 discloses a hard disk accelerating system for a computer, in which an IO instruction issued by a conventional central processor is separated into a read operation and a write operation that can be performed simultaneously. Moreover, a programmable hardware register adjusts the hard disk IO cycle time to achieve maximum compatibility with different hard drive speeds. The above US patent still stores data in hard disks. Therefore, when accessing data in a hard disk, the waste in the seek-time for moving the magnetic head and the rotation time of the spindle motor cannot be avoided.

SUMMARY OF THE INVENTION

An object of the present invention is to provide a device and method for simulating a hard disk, in which a simulated hard disk is provided in a main memory module to increase the speed of the computer.

To achieve the above object, the present invention provides a device for simulating a hard disk and used in a computer system. The device for simulating a hard disk comprises a main memory module, at least including a memory, a setting module used to set the main memory module to have a memory access area and a hard disk access area, and a core logic chip. The core logic chip comprises a core logic body for controlling read/write of data of the main memory module, a memory controller connected to the core logic body and used for receiving a memory read/write signal to control read/write of data of the memory access area, and a conversion interface controller connected to the core logic body and used for receiving a hard disk read/write signal to control read/write of data of the hard disk access area. The conversion interface controller also converts the hard disk read/write signal to the memory read/write signal. When the core logic chip receives a read/write signal sent to the main memory module from the computer system, it determines whether the read/write signal is a memory read/write signal or a hard disk read/write signal. The read/write signal will be sent to the memory controller if it is a memory read/write signal, and the read/write signal will be sent to the conversion interface controller if it is a hard disk read/write signal.

To achieve the above object, the present invention also provides a method for simulating a hard disk and used in a computer system. The method for simulating a hard disk comprises the steps of: setting a main memory module in the computer system to have a memory access area and a hard disk access area; providing a core logic chip having a memory controller for controlling data access of the memory access area and a conversion interface controller for controlling data access of the hard disk access area; using the core logic chip to receive a read/write signal sent to the main memory module from the computer system and determine whether the read/write signal is a memory read/write signal or a hard disk read/write signal; sending the read/write signal to the memory controller if it is a memory read/write signal; and sending the read/write signal to the conversion interface controller if it is a hard disk read/write signal.

The device and method for simulating a hard disk of the present invention provides a simulated hard disk in the main memory module. Data can be stored in the simulated hard disk to increase effectively the speed of computer.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

The present invention proposes a device and method for simulating a hard disk to allow the memory of a computer system to have the function of hard disk access. The present invention uses part of the space in the memory as a simulated hard disk, and places data in this space. Because the data access speed of memory is much faster than that of a hard disk, the present invention can enhance the speed of a computer.

Figure 1:
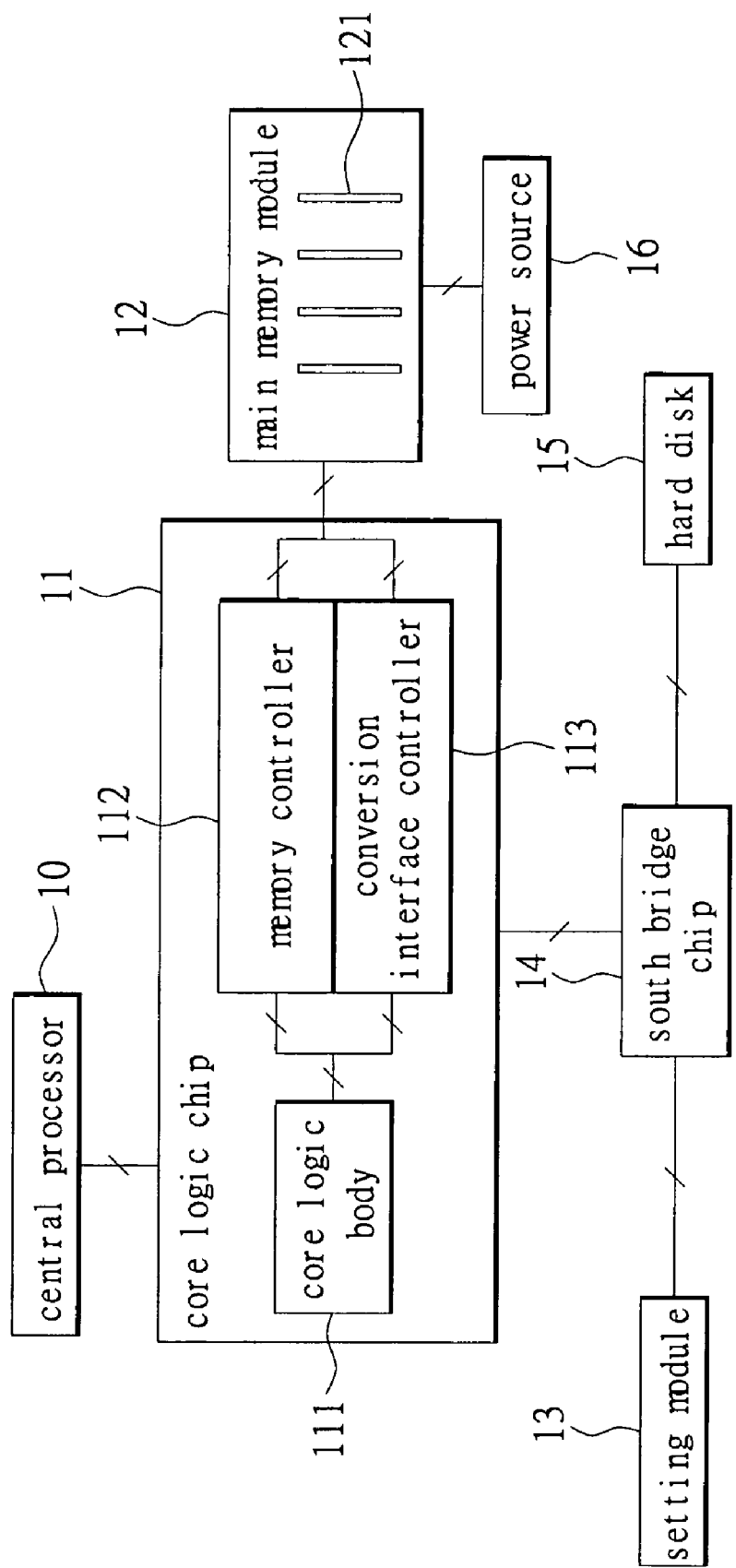
FIG. 1 is a system architecture diagram of a device for simulating a hard disk according to a preferred embodiment of the present invention.

As shown in FIG. 1, a device for simulating a hard disk according to a preferred embodiment of the present invention comprises a central processor 10, a core logic chip 11, a main memory module 12, a setting module 13, a south bridge chip 14 and a hard disk 15. The core logic chip 11 further comprises a core logic body 111, a memory controller 112 and a conversion interface controller 113. The memory controller 112 and the conversion interface controller 113 are connected to the core logic body 111. The core logic body 111 is used to control data read/write of the main memory module 12. The conversion interface controller 113 is used to receive a memory read/write signal, and controls read/write of data stored in the main memory module 12 based on this memory read/write signal. The conversion interface controller 113 is used to receive a hard disk read/write signal, and provides format conversion for this hard disk read/write signal and converts it to a memory read/write signal compatible with the main memory module 12. The conversion interface controller 113 then controls read/write of data stored in the main memory module 12 based on this converted memory read/write signal. The core logic chip 11 can receive a read/write signal sent to the main memory module 12 from the computer system and determines whether this read/write signal is a memory read/write signal or a hard disk read/write signal. If the read/write signal is a memory read/write signal, it is sent to the memory controller 112; if the read/write signal is a hard disk read/write signal, it is sent to the conversion interface controller 113.

The main memory module 12 is connected to the core logic chip 11, and is used to receive a memory read/write signal output by the memory controller 112 or the conversion interface controller 113. The main memory module 12 is composed of a plurality of memories 121. These memories 121 belong to volatile memories with faster read speed such as SDRAM, DDRAM, and so on. In this embodiment, in addition to providing storage of data or program for execution of the computer system, the main memory module 12 can also be used as a simulated hard disk. The setting module 13 sets the main memory module 12 to have a memory access area as the primary memory in the computer system and a hard disk access area as the simulated hard disk. The computer system discriminates the main memory system 12 according to this setting. Because the memories 121 used in the main memory module 12 are volatile, in order to avoid loss of data due to no power source when the computer system is turned off, a power source 16 is also provided for the main memory module 12 to ensure that the hard disk access area used as a simulated hard disk in the main memory module 12 can still keep data. This power source is a backup power source in the computer system or a battery (e.g., a mercury cell).

In this embodiment, the setting module 13 is connected to the south bridge chip 14. While setting the main memory module 12, the above memory access area and hard disk access area are partitioned with the memory 121 in the main memory module 12 as the unit. After being set by the setting module 12 and rebooted, the computer system can discriminate between the hard disk 15 connected to the south bridge 14 and the simulated hard disk in the main memory module 12. This embodiment uses the main memory module 12 to simulate a hard disk. For this computer system, performing data read/write to this simulated hard disk is just like performing data read/write to a common hard disk. When the central processor 10 sends out a hard disk read/write signal, if the data to be accessed by this hard disk read/write signal are in the hard disk 15, this hard disk read/write signal will be transferred to the hard disk 15 via the south bridge chip 14; if the data to be accessed by this hard disk read/write signal are in the hard disk access area in the main memory module 12, this hard disk read/write signal will be transferred to the hard disk access area in the main memory module 12 via the conversion interface controller 113.

The above core logic chip 11 is a north bridge chip. The conversion interface controller 113 is a hard disk interface to memory interface controller. The hard disk interface can be IDE or SATA interface. The setting module 13 is a basic input/output system (BIOS).

Figure 2:
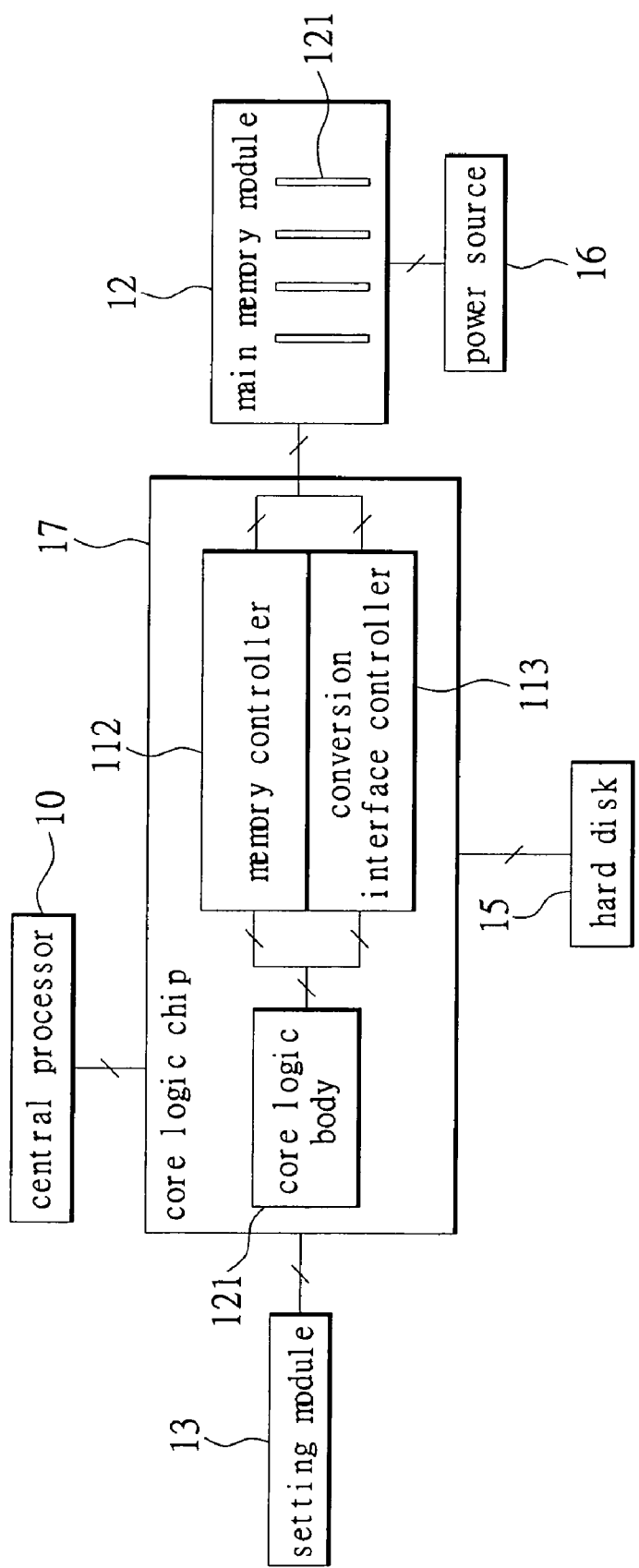
FIG. 2 is a system architecture diagram of a device for simulating a hard disk according to another preferred embodiment of the present invention.

FIG. 2 is a system architecture diagram of a device for simulating a hard disk according to another preferred embodiment of the present invention. This embodiment is different from the above embodiment in that the core logic chip 17 is a chip integrating north bridge and south bridge, and the setting module 13 and the hard disk 15 are connected to the core logic chip 17. The operation of the simulated hard disk in this embodiment is the same as in the above embodiment. That is, a hard disk access area as a simulated hard disk is formed in the main memory module 12.

Figure 3:
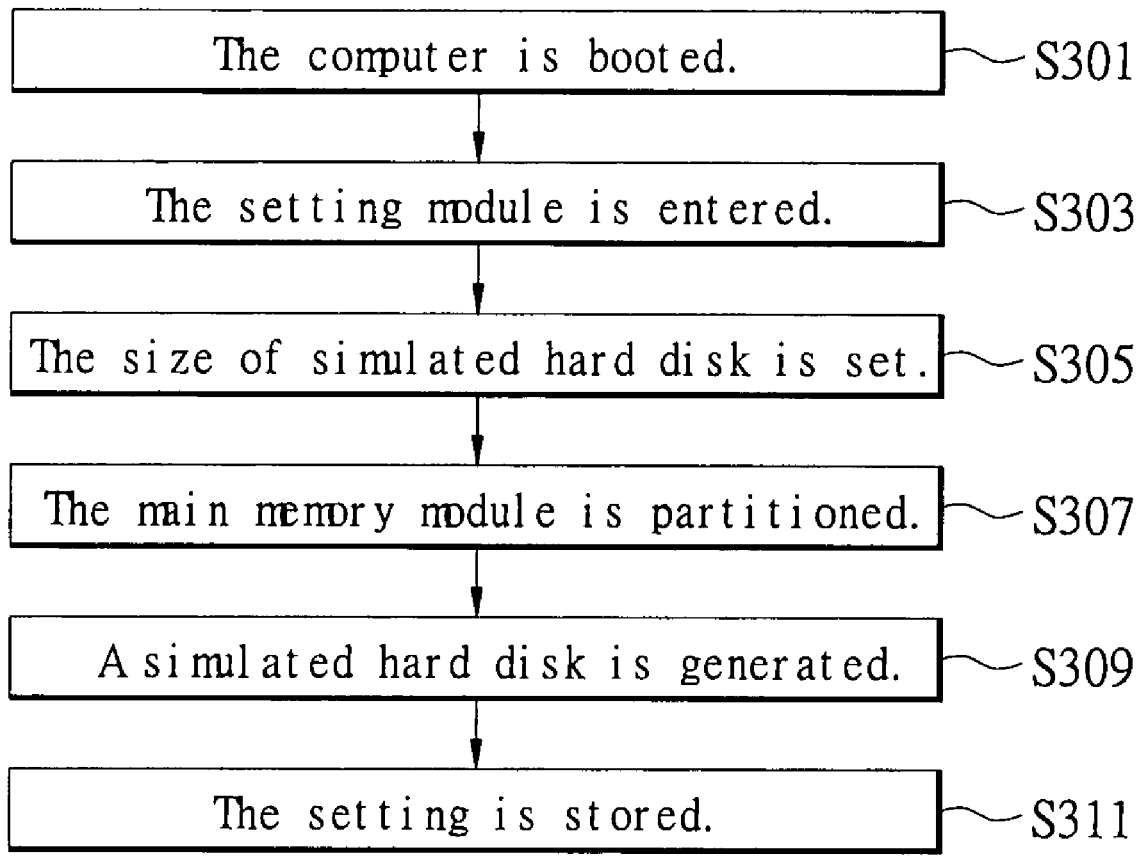
FIG. 3 is a flowchart of a method for simulating a hard disk according to a preferred embodiment of the present invention.

FIG. 3 is a flowchart of a method for simulating a hard disk according to a preferred embodiment of the present invention. The method for simulating a hard disk of the present invention comprises the following steps. First, the computer is booted (Step S301). The setting module is then entered (Step S303). Next, the size of the simulated hard disk is set (Step S305). The computer partitions the main memory module according to the set size of the simulated hard disk (Step S307). Subsequently, a simulated hard disk is generated in the main memory module 12 (Step S309). At this time, the main memory module 12 has a memory access area and a hard disk access area. Finally, the setting module 13 stores the above setting (Step S311). Therefore, after the computer is rebooted, it can discriminate the simulated hard disk in the main memory module 12.

The present invention provides a device and method to allow a main memory module in a computer to have the function of hard disk access. A large amount of data that will be used in the present hard disk can be placed in the simulated hard disk in the main memory module to enhance greatly the speed of computer.

Besides, using the hardware architecture of the main memory module to simulate a hard disk has the following advantages.

1. The read/write speed of the simulated hard disk is synchronous with the processing speed of the main memory, hence having no wait time.
2. The setting of the simulated hard disk is accomplished with the BIOS, and the computer can automatically discriminate the simulated hard disk after setting without using a driver.
3. Data read/write control of the simulated hard disk is managed by the conversion interface controller without any waste of the resources of the computer system.
4. The present invention is compatible with any operation system.
5. There is no cost burden.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A device for simulating a hard disk and used in a computer system, comprising:

a main memory module, at least including a memory;

a setting module used to set said main memory module to have a memory access area and a hard disk access area; said hard disk access area simulating hard disk storage space for alternatively therein data designed for said hard disk; and a core logic chip for receiving a read/write signal sent to said main memory module from a central processing unit of said computer system, said read/write signal being a memory read/write signal or a hard disk read/write signal, said core logic chip comprising:

a cord logic body receiving said read/write signal for controlling read/write of data of said main memory module for selectively determining whether said read/write signal is said memory read/write signal or said hard disk read/write signal and discriminating responsive thereto the area of the main memory module to store the read/write signal;

a dedicated memory controller connected to said core logic body and used for receiving said memory read/write signal from said core logic body to control read/write of data from/to said memory access area, wherein said dedicated memory controller is directly connected to said main memory module; and a dedicated conversion interface controller connected to said core logic body and used for receiving a hard disk read/write signal from said core logic body to control read/write of data from/to said hard disk access area, said dedicated conversion interface controller also converting said hard disk read/write signal to said memory read/write signal for alternative storage in said simulated hard disk storage space represented by said hard disk access area, wherein said dedicated conversion interface controller is directly connected to said main memory module;

whereby said core logic chip determines whether said read/write signal is said memory read/write signal or said hard disk read/write signal wherein said read/write signal is sent to said dedicated memory controller is said read/write signal is said memory read/write signal, and said read/write signal is sent to said dedicated conversion interface controller if said read/write signal is said hard disk read/write signal, at least a portion of said data designed for said hard disk being alternatively stored in said simulated hard disk storage space.

2. The device as claimed in claim 1, wherein said memory is a volatile memory.

3. The device as claimed in claim 1, wherein said setting module is a BIOS.

4. The device as claimed in claim 1, wherein said core logic chip is a north bridge chip.

5. The device as claimed in claim 1, wherein said core logic chip is a chip integrating north bridge and south bridge.

6. The device as claimed in claim 1, wherein said dedicated conversion interface controller is a hard disk interface to memory interface controller.

7. The device as claimed in claim 1, further comprising a power source connected to said main memory module.

8. The device as claimed in claim 7, wherein said power source is a backup power source in said computer system or a battery.

9. A method for simulating a hard disk and used in a computer system, comprising the steps of:

setting a main memory module in said computer system to have a memory, including a memory access area and a hard disk access area; said hard disk access area simulating hard disk storage space for alternatively storing therein data designed for said hard disk;

providing a core logic chip having a core logic body connected with a dedicated memory controller and a dedicated conversion interface controller, wherein said dedicated memory controller is provided for controlling data access of said memory access area and said dedicated conversion interface controller is provided for controlling data access of said hard disk access area;

receiving a read/write signal in said core logic chip to be sent to said main memory module from said computer system;

determining selectively, within said core logic chip whether said read/write signal is a memory read/write signal or a hard disk read/write signal, and discriminating responsive thereto the area of the main memory module to store the read/write signal;

sending said read/write signal to said dedicated memory controller if said read/write signal is a memory read/write signal; and sending said read/write signal to said dedicated conversion interface controller if said read/write signal is a hard disk read/write signal;

converting said hard disk read/write signal to said memory read/write signal for storage in said simulated hard disk storage space represented by said hard disk access area;

whereby at least a portion of said data designed for said hard disk being alternatively stored in said simulated hard disk storage space.

10. The method as claimed in claim 9, wherein a BIOS of said computer system is used to set said main memory module in said step of setting said computer system.

11. The method as claimed in claim 9, wherein said core logic chip is a north bridge chip.

12. The method as claimed in claim 9, wherein said core logic chip is a chip integrating north bridge and south bridge.

13. The method as claimed in claim 9, wherein said dedicated conversion interface controller is a hard disk interface to memory interface controller, and said dedicated conversion interface controller is connected directly to said main memory module.

14. The method as claimed in claim 9, further comprising a step of providing a power source for said main memory module.

15. The method as claimed in claim 14, wherein said power source is a backup power source in said computer system or a battery.

* * * * *